(12) United States Patent
Detweiler et al.

(10) Patent No.: US 7,594,192 B2
(45) Date of Patent: Sep. 22, 2009

(54) METHOD AND APPARATUS FOR IDENTIFYING HOTKEY CONFLICTS

(75) Inventors: Samuel R. Detweiler, Cedar Park, TX (US); Randolph M. Forlenza, Austin, TX (US); Corinne Ryan, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 11/533,176

(22) Filed: Sep. 19, 2006

(65) Prior Publication Data

US 2008/0072155 A1    Mar. 20, 2008

(51) Int. Cl.
G06F 3/048 (2006.01)
(52) U.S. Cl. .................... 715/827; 715/835
(58) Field of Classification Search .......... 715/835, 715/827
See application file for complete search history.

(56) References Cited

U.S. PATENT DOCUMENTS 6,057,845 A * 5/2000 Dupouy .............. 715/863
2004/0230947 A1  11/2004 Bales et al.
2004/0261032 A1  12/2004 Olander et al.
2005/0028105 A1   2/2005 Musson et al.
2005/0065797 A1   3/2005 Haenel
2007/0198945 A1*  8/2007 Sun et al. ............. 715/779

* cited by examiner

Primary Examiner—Ba Huynh
Assistant Examiner—Kim-Lynn Dam
(74) Attorney, Agent, or Firm—Yee & Associates, P.C.; William H. Steinberg; Rudolf O. Siegesmund

(57) ABSTRACT

The hotkey conflict avoidance program identifies a set of hotkeys in a first application and a second set of hotkeys in a simultaneously running second application, compares a first hotkey in the first set of hotkeys to a second hotkey in the second set of hotkeys and returns an error if the first hotkey conflicts with the second hotkey. Each hotkey in the first set of hotkeys is compared to each of the hotkeys in the second set of hotkeys. Other features of the hotkey conflict avoidance program include suggesting alternative hotkeys when a conflict is found and saving identified hotkeys and the corresponding actions to a persistent list. In a preferred embodiment, the first application is a screen reader for use by the visually impaired, and the simultaneously running second application is an application with which the screen reader interacts.

12 Claims, 4 Drawing Sheets

METHOD AND APPARATUS FOR IDENTIFYING HOTKEY CONFLICTS

FIELD OF THE INVENTION

The present invention relates generally to operator interface processing and relates specifically to identifying conflicts between hotkeys.

BACKGROUND OF THE INVENTION

Computer graphical user interfaces ("GUIs") create challenges for visually impaired users. GUIs for computers often contain densely packed information. Users execute many common tasks and actions by selecting icons or items from a menu on the GUI with a mouse. Because such display elements represent or control important functional elements, standard GUIs create difficulties for visually impaired computer users.

Portal environments are complex GUIs used to access and run multiple applications or portions of applications, simultaneously. Internet browsers are a commonly used to view a portal environment, displaying one or more portlets on computers. Simple examples of portlets include standalone applications such as stock tickers, local weather reports and the latest news all displayed on the same page in an Internet browser. A more complex set of portlets may interact with different portions of an application at the same time, such as a college registration system that displays class schedule options in one portlet and allows a student to enroll for a class in another portlet. While running more than one application simultaneously in a portal environment, wherein each portlet acts as the user interface for an application, each portlet in the portal environment defines controls available to the user. The controls available to the user may include global controls for the portal environment, controls for each the portlet and controls for each application running in a portlet.

Assistive technology tools, hereafter referred to as "AT tools," are programs and hardware that assist the visually impaired navigate a computer's GUI. AT tools include "screen readers" which are applications that use voice synthesizers to provide audible cues to assist visually impaired computer users navigate other computer applications. Other AT tools include Braille displays and Braille keyboards that assist the visually impaired interact with a computer and computer applications. JAWS by Freedom Scientific, WINDOWEYES by GW Micro and HPR (Home Page Reader) by IBM are commercially available AT tools for the visually impaired. Screen readers help the visually impaired access common standalone applications such as spreadsheets, word processors, e-mail editors, and Internet browsers. Screen readers have certain pre-defined or native "hotkeys" to perform commonly used tasks.

Hotkeys are a sequence of keyboard keystrokes that perform actions normally performed by clicking on a menu or icon with a mouse cursor. Common hotkeys for MS WINDOWS based applications include "Control-C" for "copy," "Control-V" for "paste" and "Control-X" for "delete." Many applications allow users to define custom hotkeys to perform a specific task.

Hotkeys are a particularly important feature for visually impaired computer users, because visually impaired users may be unable to see and click icons or menus items with a mouse cursor, and navigating menus with the arrow keys on a keyboard is tedious. There is no universal standard, however, for assigning hotkeys to a particular action or menu item. Screen readers from different vendors do not use the same set of pre-defined hotkeys for performing the same task. Additionally, screen readers and other simultaneously running applications usually have different sets of predefined hotkeys. Complications arise when a screen reader and another application running simultaneously use the same hotkey to perform different actions. The user may have to create a custom hotkey or redefine the conflicting hotkey on the other application to resolve the conflict. One known method of defining custom hotkeys is disclosed in IBM patent application Ser. No. 11/465,844, now Pub. #20080046541, "Content Navigational Shortcuts in Portlets." If a user migrates from one set of AT tools to another set of AT tools, such as by switching from JAWS to WINDOWEYES, new conflicts may arise because the new AT tools may have a completely different set of predefined hotkeys. Currently, there is no method for checking whether a screen reader's predefined hotkeys conflict with another simultaneously running application's predefined hotkeys. Users of screen readers would benefit from knowing that their user-defined hotkeys do not conflict with another simultaneously running application's hotkeys. Thus, a need exists for a method of comparing the hotkeys of a screen reader to the hotkeys of another simultaneously running application to determine if the screen reader's hotkeys conflict with the other simultaneously running application's hotkeys.

SUMMARY OF THE INVENTION

A hotkey conflict avoidance program identifies a set of hotkeys in a first application and a second set of hotkeys in a simultaneously running second application, compares a first hotkey in the first set of hotkeys to a second hotkey in the second set of hotkeys and returns an error if the first hotkey conflicts with the second hotkey. Each hotkey in the first set of hotkeys is compared to each of the hotkeys in the second set of hotkeys. Other features of the hotkey conflict avoidance program include suggesting alternative hotkeys when a conflict is found, and saving identified hotkeys with the corresponding actions to a persistent list. In a preferred embodiment, the first application is a screen reader for use by the visually impaired and the simultaneously running second application is an application running in a portlet with which the screen reader interacts. The hotkey conflict avoidance program can be further applied to multiple simultaneously running applications.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations.

The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Hotkey Conflict Avoidance Tool (HCAT).

Figure 1:
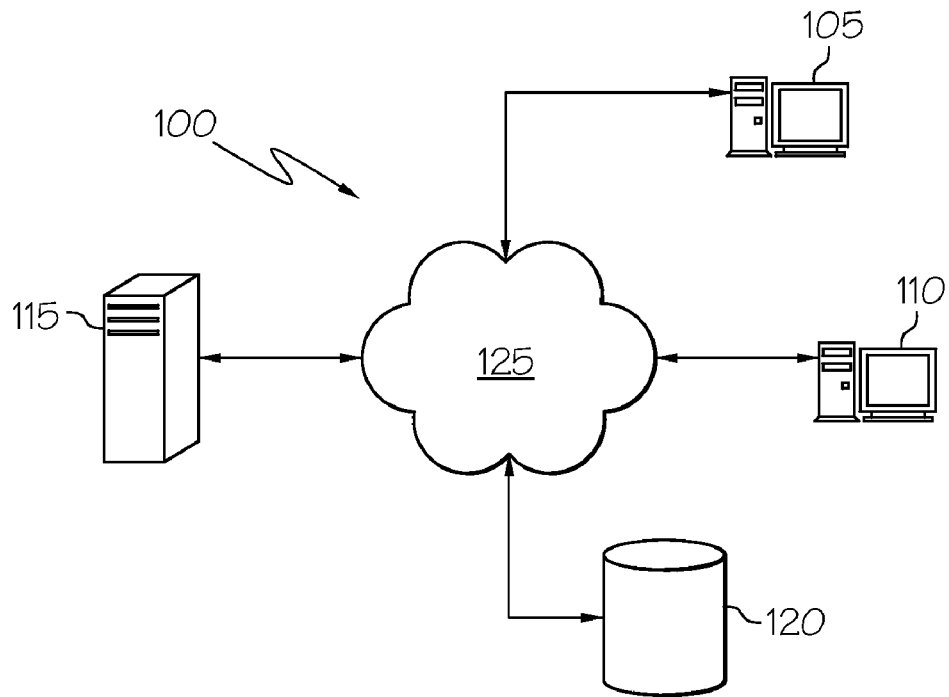
FIG. 1 is an exemplary computer network.

Additionally, the HCAT is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
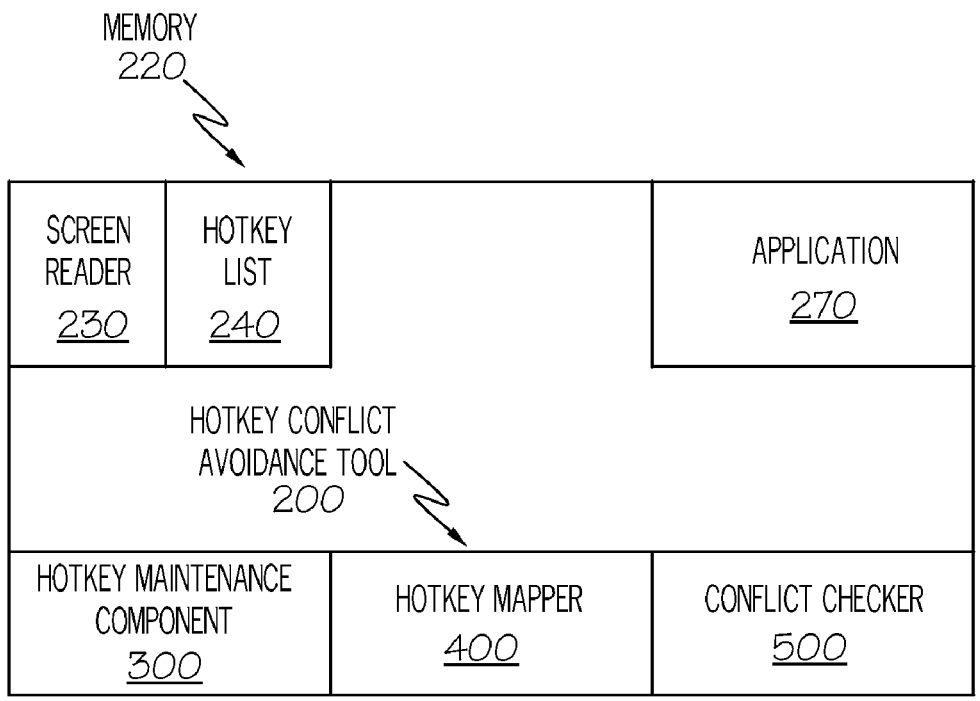
FIG. 2 describes programs and files in a memory on a computer.

HCAT 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, HCAT 200 may reside in more than one memory distributed across different computers, servers, logical partitions, or other hardware devices. The elements depicted in memory 220 may be located in or distributed across separate memories in any combination, and HCAT 200 may be adapted to identify, locate, and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to HCAT 200, memory 220 may include screen reader 230, hotkey list 240 and application 270 with which HCAT 200 interacts. HCAT 200 has three components: hotkey maintenance component 300, hotkey mapper 400, and conflict checker 500.

Figure 3:
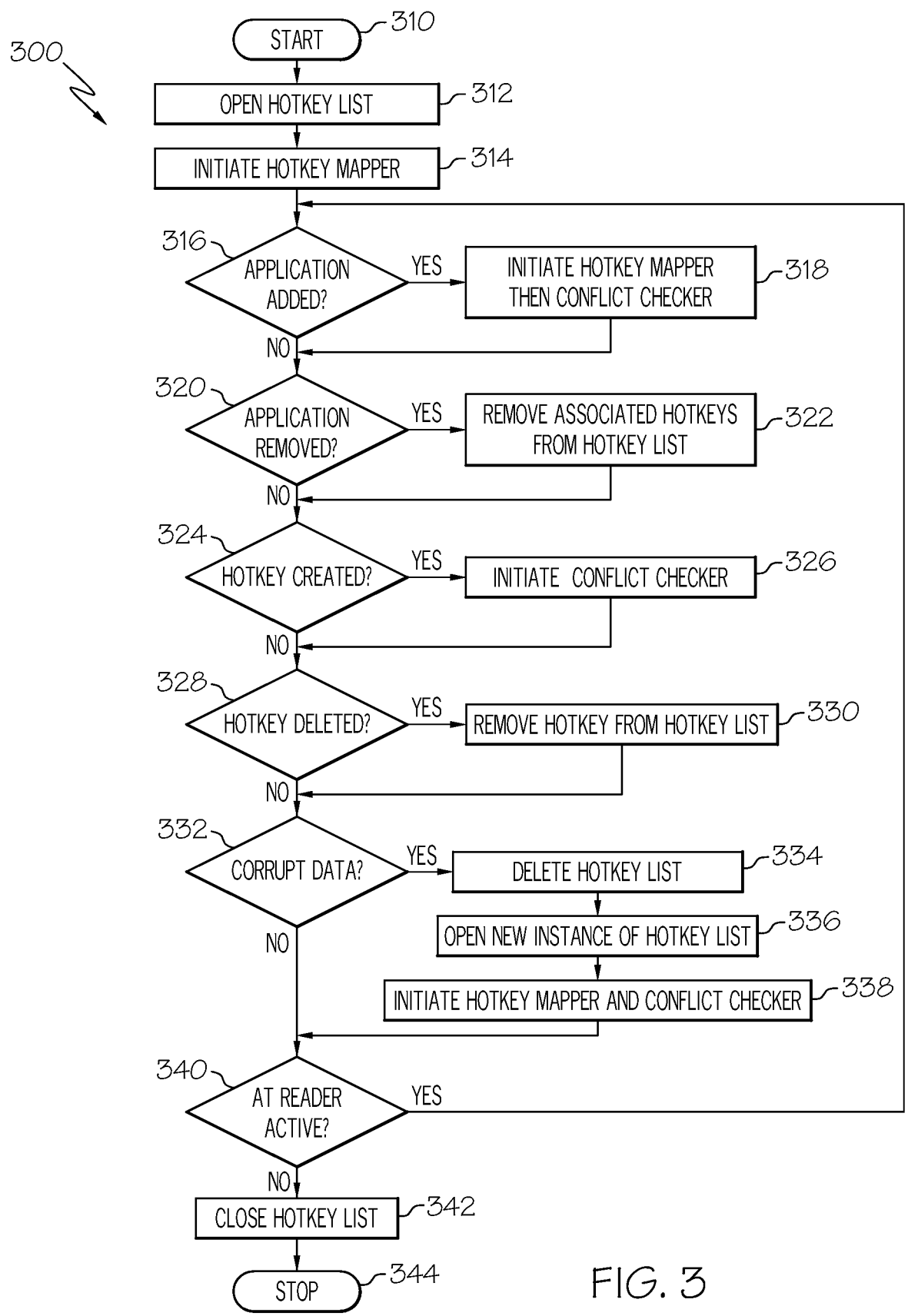
FIG. 3 is a flowchart of a hotkey maintenance component.

FIG. 3 describes the functions of hotkey maintenance component 300. Hotkey maintenance component 300 starts whenever screen reader 230 starts (310). Hotkey maintenance component 300 opens hotkey list 240 (312). Hotkey list 240 can be opened with the following command:
    void openHotkeyList( );

Alternatively, if hotkey list 240 does not exist yet, the command:
    void setHotkeyList(source, Object[String1, String2]);

creates an empty list capable of storing each hotkey as "String1" and mapping each hotkey to an action as "String2" where "source" is the name of screen reader 230 or application 270. Hotkey maintenance component 300 initiates hotkey mapper 400 (314) to index hotkeys used by screen reader 230 as described in FIG. 4. Hotkey maintenance component 300 monitors screen reader 230 for specific actions according to steps 316-338. If application 270 is run simultaneously with or accessed by screen reader 230 (316), hotkey maintenance component 300 initiates hotkey mapper 400 and then initiates conflict checker 500 (318) to index hotkeys used by application 270 and to identify conflicts as described in FIG. 5. If application 270 is inactive or is no longer accessed by portlet 230 (320), hotkey maintenance component 300 removes associated hotkeys from hotkey list 240 (322). The command:
    void removefromHotkeyList(source, String1[ ], String2[ ]);

can remove hotkeys from the hotkey list associated with an identified source. If a new hotkey is created by the user of screen reader 230 (324), hotkey maintenance component 300 initiates conflict checker 500 (326). If a hotkey is deleted by the user of screen reader 230 (328), hotkey maintenance component 300 removes the hotkey from hotkey list 240 (330). If hotkey list 240 becomes corrupted (332), hotkey maintenance component 300 deletes hotkey list 240 (334) with a command such as:
    void disposeHotkeyList( );

and hotkey maintenance component 300 opens a new instance of hotkey list 240 (336). Next hotkey maintenance component 300 initiates hotkey mapper 400 then initiates conflict checker 500 (338) in sequence for screen reader 230 and application 270. Hotkey maintenance component 300 continues to monitor screen reader 230 for specific actions according to steps 316-338 for as long as screen reader 230 remains active (340). When screen reader 230 is no longer active, hotkey maintenance component 300 closes hotkey list 230 (342) with a command such as:
    void closeHotkeyList( );

and then hotkey maintenance component 300 stops (344).

Figure 4:
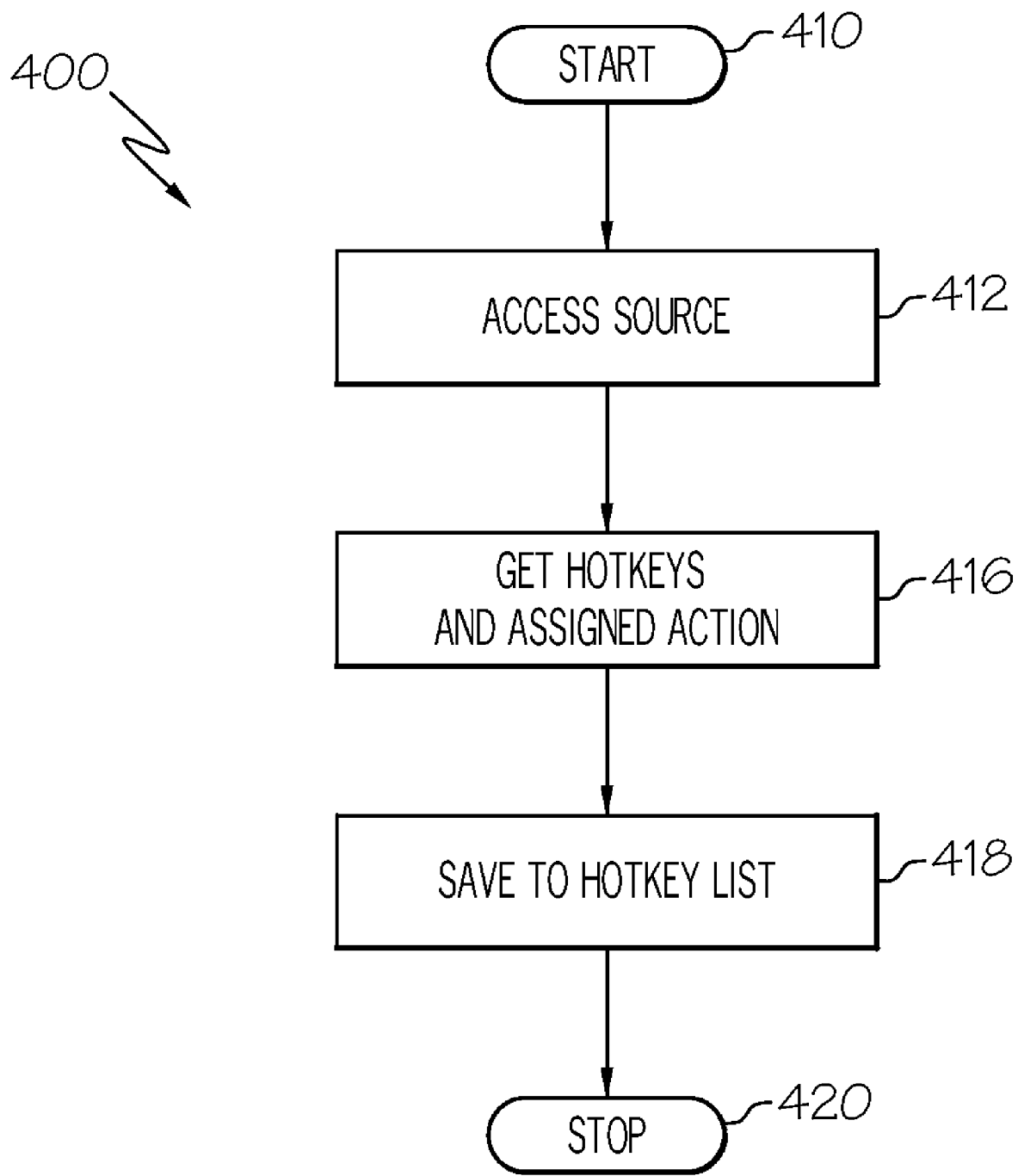
FIG. 4 is a flowchart of a hotkey mapper.

Referring to FIG. 4, hotkey mapper 400 starts (410) whenever initiated by hotkey maintenance component 300. Hotkey mapper 400 accesses a source as specified by hotkey maintenance component 300 (412), such as screen reader 230 or application 270. Hotkey mapper 400 gets all the defined hotkeys and assigned actions (416) using a command such as:
    Object[String1, String2] getAllHotkeys(source, true);

and then saves the hotkey and mapped actions to hotkey list 240 (418). A command such as:
    void saveHotkeyList( );

may be used by hotkey mapper 400 to save the hotkey and mapped actions to hotkey list 240. In an alternative embodiment of HCAT 200, all writes to hotkey list 240 are permanent and the save command is unnecessary. After writing and saving the hotkeys and assigned actions to hotkey list 240, hotkey mapper 400 stops (420).

Figure 5:
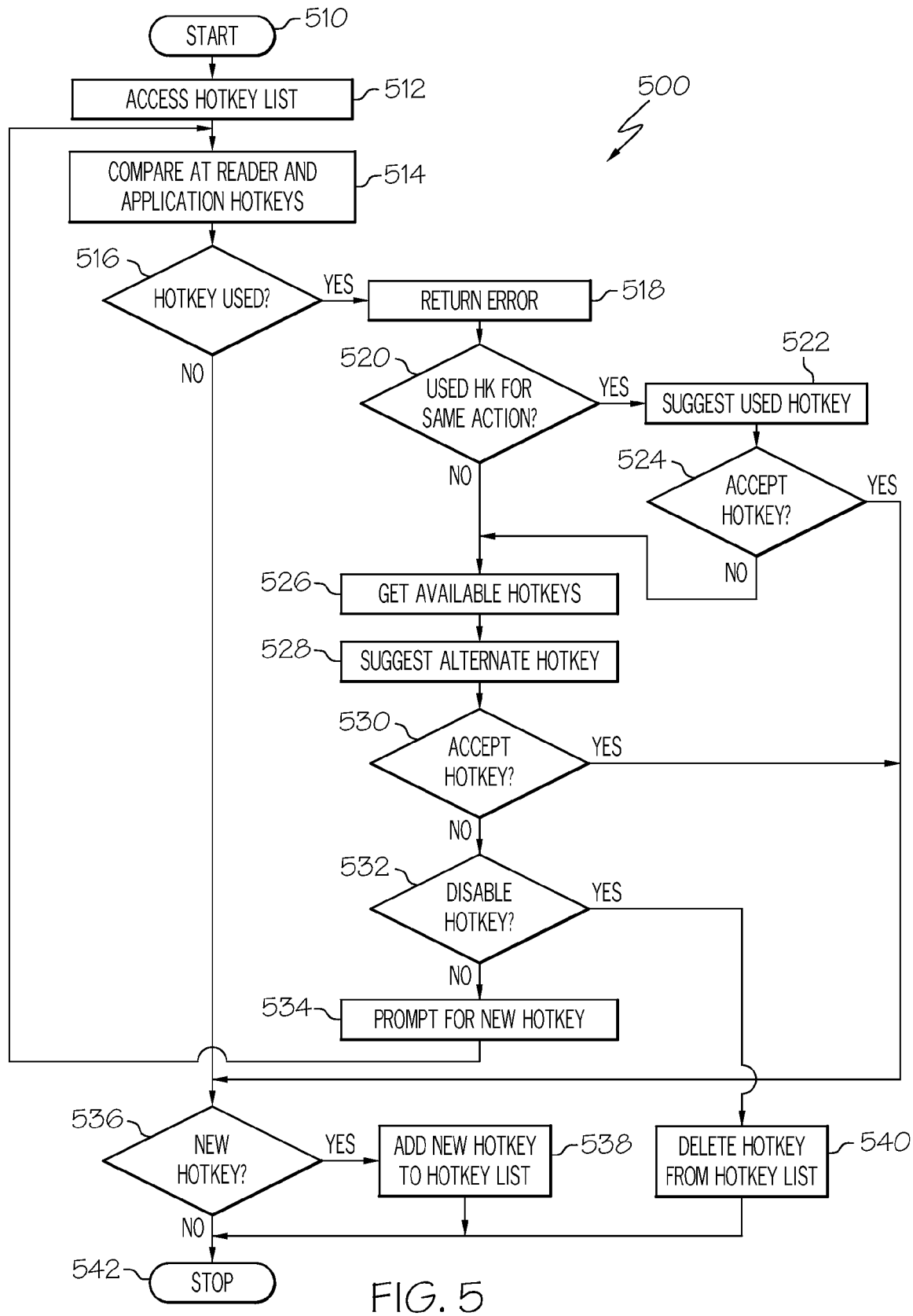
FIG. 5 is a flowchart of a conflict checker.

Conflict checker 500 starts when initiated by hotkey maintenance component 300 as shown in FIG. 5. Conflict checker 500 opens hotkey list 240 (512) and compares each hotkey from portlet 230 to the hotkeys used by underlying application 270 (514). Whenever conflict checker 500 runs in response to a newly defined hotkey in screen reader 230, only the new hotkey is compared to the hotkeys of underlying application 270. Conflict checker 500 determines if the hotkey in screen reader 230 conflicts with a hotkey in application 270 (516). A command such as:

Boolean isHotkeyTaken(source, String1);

may be used by conflict checker 500 to determine if the hotkey in screen reader 230 conflicts with a hotkey in application 270. If the Boolean operation returns a "false" argument indicating there is no conflict, conflict checker 500 determines if the hotkey in screen reader 270 is new (536). If the hotkey in screen reader 270 is new, conflict checker 500 adds the new hotkey and mapped action to hotkey list 240 (538). A command such as:

Object[ ] addToHotkeyList(source, Object[String1, String2]);

may be used by conflict checker 500 to add the new hotkey and mapped action to hotkey list 240. If the hotkey in screen reader 270 is already in hotkey list 240, or after saving the hotkey in screen reader 270 to hotkey list 240, conflict checker 500 stops (542). If the Boolean operation at step 516 returns a "true" argument indicating a conflict, conflict checker 500 displays an error message (518). Conflict checker 500 determines if a previously indexed "used" hotkey in hotkey list 240 maps to the same action as the conflicting hotkey (520). A command such as:

Boolean isHotkeyTaken(source, String2);

may be used by conflict checker 500 to make the determination. If the Boolean operation returns a "true" argument indicating that a used hotkey maps to the same action as the conflicting hotkey, conflict checker 500 suggests the used hotkey as an alternative (522). If the user of screen reader 230 accepts the alternative hotkey (524), conflict checker 500 verifies the alternative hotkey is already in hotkey list 240 (536), then conflict checker 500 stops (542). If the user of screen reader 230 does not accept the alternate hotkey at step 524, or if the Boolean operation at step 520 returns a "false" argument indicating that there are no hotkeys mapped to the same action, conflict checker 500 generates a list of available hotkeys (526). The command:

Object[String1] getAllHotkeys(source, false);

can generate a list of hotkeys not used by screen reader 230 nor by application 270. Conflict checker 500 suggests one or more alternate hotkeys from the list of available hotkeys (528). If the user of screen reader 230 accepts the alternate hotkey (530), conflict checker 500 determines whether the alternate hotkey is already in hotkey list 240 (536), adds the hotkey to hotkey list 240 if needed (538), and stops (542). If the user of portlet 230 does not accept the alternate hotkey at step 530, conflict checker 500 offers the option of disabling the conflicting hotkey (532). If the user of screen reader 230 decides to disable the conflicting hotkey, conflict checker 500 removes the conflicting hotkey from hotkey list 240 (540) and stops (542). If the user of portlet 230 decides not to disable the conflicting hotkey at step 532, conflict checker 500 prompts the user to try a new hotkey (534) and restarts the conflict check at step 514.

The embodiment of HCAT 200 shown here adds functionality when accessing applications with a screen reader for visually impaired computer users. HCAT 200 can be adapted as a testing tool for programmers and developers of applications for complex portal environments to test hotkeys of a first application against the hotkeys of one or more simultaneously running applications. When not integrated with a specific application, such as a screen reader, the hotkey mapper 400 and conflict checker 500 components of HCAT can run as independent programs. A simplified embodiment of HCAT 200 does not use a persistent hotkey list. Another simplified embodiment of HCAT 200 does not map hotkeys to an action or suggest alternate hotkeys to replace a conflicting hotkey.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for identifying hotkey conflicts between a screen reader and a plurality of applications running simultaneously in multiple portlets, with which the screen reader interacts, the computer implemented process comprising:

responsive to activation of the screen reader, automatically identifying a first plurality of hotkeys in the screen reader and a second plurality of hotkeys in the plurality of applications, wherein the screen reader uses voice synthesizers to provide audible cues for navigation of the plurality of applications;

comparing the first plurality of hotkeys to the second plurality of hotkeys; and determining a plurality of matching hotkeys, each matching hotkey being a hotkey in the first plurality of hotkeys that matches an identical hotkey in the second plurality of hotkeys, and for each matching hotkey, suggesting an alternate hotkey.

2. The computer implemented process of claim 1 further comprising mapping each hotkey in the first plurality of hotkeys to a corresponding action.

3. The computer implemented process of claim 1 wherein the suggested hotkey is a previously identified hotkey mapped to the same action as the matching hotkey.

4. The computer implemented process of claim 1 further comprising saving each of the hotkeys in the first plurality of hotkeys that are not matching hotkeys to the used hotkey file.

5. An apparatus for identifying hotkey conflicts between a screen reader and a plurality of applications running simultaneously in multiple portlets, with which the screen reader interacts, the apparatus comprising:

a processor;

a memory connected to the processor;

a first application in the computer memory;

a second application in the computer memory running simultaneously with the first application;

a hotkey conflict avoidance program in the memory operable to:

responsive to activation of the screen reader, automatically identify a first plurality of hotkeys in the screen reader and a second plurality of hotkeys in the plurality of applications, wherein the screen reader uses voice synthesizers to provide audible cues for navigation of the plurality of applications;

compare the first plurality of hotkeys to the second plurality of hotkeys; and determine a plurality of matching hotkeys, each matching hotkey being a hotkey in the first plurality of hotkeys that matches an identical hotkey in the second plurality of hotkeys, and for each matching hotkey, suggesting an alternate hotkey.

6. The apparatus of claim 5 wherein the hotkey conflict avoidance program in the memory is further operable to map each hotkey in the first plurality of hotkeys to a corresponding action.

7. The apparatus of claim 5, wherein the suggested hotkey is a previously identified hotkey mapped to the same action as the matching hotkey.

8. The apparatus of claim 5 wherein the hotkey conflict avoidance program in the memory is further operable to save each of the hotkeys in the first plurality of hotkeys that are not matching hotkeys to the used hotkey file.

9. A computer readable memory containing a plurality of instructions to cause a computer to identify hotkey conflicts between a screen reader and a plurality of applications running simultaneously in multiple portlets, with which the screen reader interacts, the plurality of instructions comprising:
- a first instruction, responsive to activation of the screen reader, automatically to identify a first plurality of hotkeys in the screen reader and a second plurality of hotkeys in the plurality of applications, wherein the screen reader uses voice synthesizers to provide audible cues for navigation of the plurality of applications;
- a second instruction to compare the first plurality of hotkeys to the second plurality of hotkeys; and
- a third instruction to determine a plurality of matching hotkeys, each matching hotkey being a hotkey in the first plurality of hotkeys that matches an identical hotkey in the second plurality of hotkeys, and for each matching hotkey, suggesting an alternate hotkey.

10. The computer readable memory of claim 9 further comprising an instruction to map each hotkey in the first plurality of hotkeys to a corresponding action.

11. The computer readable memory of claim 9, wherein the suggested hotkey is a previously identified hotkey mapped to the same action as the matching hotkey.

12. The computer readable memory of claim 9 further comprising an instruction to save each of the plurality of first hotkeys that are not matching hotkeys to the used hotkey file.

* * * * *